UNITED STATES PATENT OFFICE.

WILLIAM FITZ CHARLES MASON McCARTY, OF AIX-LA-CHAPELLE, GERMANY.

PROCESS OF SOLIDIFYING LIQUID OR SEMI-LIQUID FATTY ACIDS.

SPECIFICATION forming part of Letters Patent No. 292,669, dated January 29, 1884.

Application filed August 7, 1883. (No specimens.)

*To all whom it may concern:*

Be it known that I, WILLIAM FITZ CHARLES MASON MCCARTY, a citizen of the United States, and a resident of the city of Aix-la-Chapelle, in the German Empire, have invented certain new and useful improvements in processes for solidifying liquid or semi-liquid fatty acids, mineral, vegetable, and animal oils, and the transformation of the said oils into fatty acids, fully set forth and described in the following specification.

This invention relates to improvements in processes for solidifying liquid or semi-liquid fatty acids, mineral, vegetable, and animal oils, and also to the transformation of the said mineral, vegetable, or animal oils into fatty acids.

In searching for means for utilizing the oleine obtained according to the process described in the Letters Patent granted to me under No. 282,547, and dated August 7, 1883, and No. 283,003, dated August 14, 1883, I have studied the various processes employed heretofore for solidifying liquid fatty substances, as well as for transforming the same into solid fatty acids; but none of the processes known to me up to this day show any practical results.

The numerous experiments which I have made, and specially those made for the purpose of enabling me to utilize the oleine obtained by my aforementioned process, have enabled me to perfect the processes known and to correct the errors in defective processes.

Through a series of operations constituting a process composed of known and unknown means of treating such said substances as above mentioned, and which form the basis of the present process, I have succeeded in obtaining the following results: (A,) the solidification and transformation not only of the oleine above named, but of all fatty acids with low melting-points, into solid fatty acids with very high melting-points; (B,) the solidification and transformation of mineral, vegetable, and animal oils into solid fatty acids.

In order to carry my said process into effect, I employ the following preliminary treatment: When fatty substances are used, I commence by freeing the said fatty bodies (oleine or fatty acids) of the acids which they may have taken up during the manufacture. It must be remarked that this first treatment is not necessary when fatty bodies are employed which are obtained by processes when no acids are made use of, and specially such as are obtained by my patented process as mentioned above. When mineral, vegetable, or animal oils are employed, I first saponify the same or give them a gelatinous consistence by employing processes already known. Having thus purified the fatty substances, or partially solidified the oil employed, I subject the same to the following treatment:

I. *First transformation.*—The material to be treated is introduced into a vessel lined with lead, provided with a serpentine tube or coil for free steam and a central tube ending in a system of injector-nozzles for producing a strong agitation by employing a suitable blower. The temperature of the material is raised to about 100° centigrade, after which the product is agitated or thoroughly stirred by means of the air introduced through the injector-nozzles, and eight to ten per cent. of the weight of the material in ordinary nitric acid, or about five per cent. concentrated nitric acid, added in small quantities. The agitation of the mass and the temperature of 100° is kept up for about an hour, after which the agitation is continued, and about one per cent. of the weight of the mass starch or other product of like nature added little by little, in order to carbonize the material—such as, for instance, tragacanth gum. The agitation is continued for two hours, during which the temperature is raised to about 120° centigrade, and is then reduced to about 70° centigrade. In this manner the first transformation of the material is produced.

II. *First washing.*—After this operation, the material is washed until all trace of acid has been eliminated.

III. *Second transformation.*—After the material has been rendered neutral, the same is introduced into an apparatus provided with an agitating apparatus, with a like quantity, in weight, of water strongly saturated with lime, caustic potassium, ammoniac, or other like matter. The temperature is now raised to 300° centigrade, and this heat maintained for about four hours. The employment of my apparatus with automatic circulation working under a vacuum permits me to work at a temperature of 160°, and gives the best results. For this operation the apparatus is lined with lead or tin, or is galvanized with iridium, and the tubes and valves or cocks must be treated in a like manner.

IV. *Second washing.*—This second transformation being completed, the material is again placed in a vessel provided with a suitable water-jacket, and allowed to stand until the chemicals and water employed have settled to the bottom of the vessel.

V. *Acidification.*—After the second washing, about one per cent. of the weight of the material sulphuric acid of sixty-six degrees strength is added, and the entire mass thoroughly agitated.

VI. The so acidified mass is now distilled, for which purpose I prefer to employ my patented distilling apparatus, which said apparatus works under the influence of vacuum. The product of this distillation is white, has a very high melting-point, gives, when made up into candles, a beautiful flame, and can compete with the stearine candles of first quality.

The stearine-like product of the mineral oils is of a comparatively weaker kind; but when mixed with the oleine products or treated direct with the oleine in suitable proportions it has a like high melting-point with stearic acid of the first quality.

It is evident that my said process can be modified in various ways without departing from the tenor of my said invention.

Having described my said invention and the manner in which the same is to or may be carried into effect, I wish it to be understood that what I claim, and desire to secure by Letters Patent, is—

1. The transformation of oleine into a solid fatty acid with high melting-point, so that the same can be employed to like purposes as stearic acid of first quality, substantially as set forth in the foregoing specification.

2. The transformation of mineral, vegetable, and animal oils into a solid fatty acid by first saponifying or otherwise treating the same until they obtain a gelatinous-like consistency, and then treating them according to my said process, so that the same are converted into solid fatty acids, substantially as set forth in the foregoing specification.

3. The improved process for solidifying and transforming liquid or semi-liquid fatty acids into solid fatty acids, consisting of (*a*) heating the fatty acids by means of free steam under continuous agitation of the mass by means of air; (*b*) successively adding about eight to ten per cent. common or five per cent. concentrated nitric acid during the agitation of the mass; (*c*) maintaining a temperature of about 100° centigrade for the space of about one hour under a continuous agitation of the material; (*d*) successively adding about one per cent. of starch or other similar product and continuing the aforementioned agitation; (*e*) continuing the agitation for about two hours, raising the temperature to about 120° centigrade, and then reducing the same to about 70° centigrade; (*f*) washing the product so obtained until all trace of acid is eliminated; (*g*) treating the material with a like quantity, in weight, of water strongly saturated with lime, caustic potash, ammoniac, or other equivalent material; (*h*) heating the product; (*i*) washing the product so obtained, then allowing the water and chemical products to settle or subside out of the same; (*j*) treating this product with about one per cent. of sulphuric acid and energetically agitating the same; (*k*) distilling the product in a continuous vacuum, thus obtaining a pure white mass with very high melting-point, substantially as described.

4. The application and employment of the transformed and solidified oleine and the solidified and transformed mineral, vegetable, or animal oils for themselves alone or suitable admixtures of the same for the manufacture of candles and other industrial purposes, substantially as set forth in the foregoing specification.

WILLIAM FITZ CHARLES MASON McCARTY.

Witnesses:
EDWIN A. BRYDGES,
ANTHONY STEFFEN.